US006953831B2

(12) United States Patent
Ishihama et al.

(10) Patent No.: US 6,953,831 B2
(45) Date of Patent: Oct. 11, 2005

(54) ETHYLENE POLYMERS

(75) Inventors: Yoshiyuki Ishihama, Mie (JP); Toshihiko Sugano, Mie (JP); Masayuki Yamazaki, Kanagawa (JP); Kou Obata, Kanagawa (JP)

(73) Assignee: Japan Polychem Corporation, Tokyo (JP)

( * ) Notice: Subject to any disclaimer, the term of this patent is extended or adjusted under 35 U.S.C. 154(b) by 6 days.

(21) Appl. No.: 10/450,448

(22) PCT Filed: Dec. 21, 2001

(86) PCT No.: PCT/JP01/11285

§ 371 (c)(1),
(2), (4) Date: Jun. 19, 2003

(87) PCT Pub. No.: WO02/051886

PCT Pub. Date: Jul. 4, 2002

(65) Prior Publication Data

US 2004/0048993 A1 Mar. 11, 2004

(30) Foreign Application Priority Data

Dec. 21, 2000 (JP) ...................................... 2000-388171

(51) Int. Cl.$^{7}$ .............................................. C08F 110/02

(52) U.S. Cl. ....................... 526/352; 526/160; 526/943; 526/129

(58) Field of Search .......................... 526/352, 60, 943, 526/129, 160

(56) References Cited

U.S. PATENT DOCUMENTS

| | | | | |
|---|---|---|---|---|
| 5,308,811 A | * | 5/1994 | Suga et al. | 502/62 |
| 5,543,376 A | | 8/1996 | Bergmeister | |

FOREIGN PATENT DOCUMENTS

| | | | |
|---|---|---|---|
| EP | 511 665 | | 11/1992 |
| EP | 808 849 | | 11/1997 |
| JP | 2-53811 | | 2/1990 |
| JP | 2-132109 | | 5/1990 |
| JP | 2-52654 | | 11/1990 |
| JP | 7-90021 | | 4/1995 |
| JP | 8-59741 | | 3/1996 |
| JP | 9-25313 | | 1/1997 |
| JP | 10-7726 | | 1/1998 |
| JP | 10-17619 | | 1/1998 |
| JP | 10-182742 | | 7/1998 |
| JP | 11-60633 | | 3/1999 |
| JP | 11-310612 | * | 11/1999 |
| JP | 2001-98028 | | 4/2001 |
| WO | WO 95/10548 | | 4/1995 |

* cited by examiner

*Primary Examiner*—Ling-Siu Choi
(74) *Attorney, Agent, or Firm*—Oblon, Spivak, McClelland, Maier & Neustadt, P.C.

(57) ABSTRACT

An ethylene polymer excellent in molding processability represented by uniform extensibility, drawdown resistance, swell and extrudability, and mechanical properties represented by rigidity, impact resistance and ESCR, is provided. Particularly, an ethylene polymer remarkably excelent in balance between rigidity and ESCR as compared with a conventionally known ethylene polymer is provided. An ethylene polymer, which is an ethylene homopolymer or a copolymer of ethylene with an α-olefin having a carbon number of from 3 to 20, and which satisfies the following conditions (1) to (4): (1) the melt index (HLMI) under a load of 21.6 kg at 190° C. is from 0.1 to 1000 g/10 min, (2) the density (d) is from 0.935 to 0.985 g/cm$^3$, (3) the relation between HLMI and d satisfies the following formula (i): $d \geqq 0.00900 \times \log(HLMI) + 0.951$, (4) the relation between ESCR and the flexural modulus (M) satisfies the following formula (ii): $M \geqq -7310 \times \log(ESCR) + 32300$.

11 Claims, 1 Drawing Sheet

ETHYLENE POLYMERS

TECHNICAL FIELD

The present invention relates to novel ethylene polymers. More particularly, it relates to an ethylene polymer which is excellent in the balance between mechanical characteristics, particularly environmental stress cracking resistance (ESCR) and rigidity, and further, excellent in molding processability in e.g. extrusion, vacuum molding, film molding or blow molding, as compared with a conventionally known ethylene polymer.

BACKGROUND ART

In recent years, pipes and films made of plastics, injection-molded products and blow-molded products have been actively used in various industrial fields. Particularly polyethylene type resins have been used widely from such reasons as the low cost and light weight, excellence in molding processability, chemical resistance and recyclability.

In order to improve molding processability, since the molding is carried out in a molten state of polyethylene, emphasis is put on improvement in melt flow characteristics such as melt fluidity (easy-extrudability), melt extensibility and melt tension. For example, ① a method of broadening the molecular weight distribution by a multistage polymerization method employing a conventional Ziegler catalyst or further incorporating a specific molecular weight component (JP-A-2-53811, JP-A-2-132109, JP-A-10-182742), ② a method of using a traditional Cr type catalyst to produce a polyethylene having a long chain branching or adding a radical generator and a crosslinking aid to a resin to introduce a long chain branching (JP-B-2-52654), ③ a method of using a polyethylene having a high melt extension stress to improve uniform extensibility (JP-A-10-7726) and the like have been proposed. However, there are many problems in the method ① such that the molded product tends to be more sticky or the impact strength tends to decrease by increase of a low molecular weight component, or gel is likely to form by increase of a high molecular weight body, there is such a problem in the method ② that the impact strength tends to decrease, and there is such a problem in the method ③ that ESCR is not sufficient yet, although molding processability and impact strength are improved.

Further, in order to improve mechanical properties, ① a method of carrying out such a control that a low molecular weight component alone is decreased while maintaining a broad molecular weight distribution by improvement of the multistage polymerization or the catalyst with respect to a conventional Ziegler catalyst product to improve impact strength while maintaining molding processability (JP-A-7-90021), ② a method of introducing an α-olefin into a specific molecular weight component by multistage polymerization to improve ESCR (JP-A-10-17619), ③ a method of using a metallocene catalyst which was developed in recent years to improve mechanical properties (JP-A-8-59741, JP-A-11-60633) and the like have been proposed. However, even by these methods, no ethylene polymer having both excellent mechanical properties and molding processability at a high level has been obtained.

It is an object of the present invention to provide a novel ethylene polymer excellent in molding processability represented by uniform extensibility, drawdown resistance and swell, and mechanical properties represented by rigidity, impact resistance and ESCR.

DISCLOSURE OF THE INVENTION

The present inventors have conducted extensive studies to overcome the above problems and as a result, found that an ethylene polymer which is an ethylene homopolymer or a polymer of ethylene with another α-olefin, wherein the melt index (HLMI) under a load of 21.6 kg and the density (d) are within specific ranges, and the relation between them is within a specific range, is excellent in molding processability and mechanical characteristics. The present inventors have further found that the balance between rigidity represented by flexural modulus and ESCR is unprecedentedly excellent, and the present invention has been accomplished on the basis of these discoveries.

Namely, the present invention provides an ethylene polymer, which is an ethylene homopolymer or a copolymer of ethylene with an α-olefin having a carbon number of from 3 to 20, and which satisfies the following conditions (1) to (4):

(1) the melt index (HLMI) under a load of 21.6 kg at 190° C. is from 0.1 to 1000 g/10 min, (2) the density (d) is from 0.935 to 0.985 g/cm$^3$, (3) the relation between HLMI and d satisfies the following formula (i):

$$d \geqq 0.00900 \times \mathrm{Log}(HLMI) + 0.951 \quad \text{(i)}$$

(4) the relation between ESCR and the flexural modulus (M) satisfies the following formula (ii):

$$M \geqq -7310 \times \mathrm{Log}(ESCR) + 32300 \quad \text{(ii)}$$

BEST MODE FOR CARRYING OUT THE INVENTION

Figure 1:
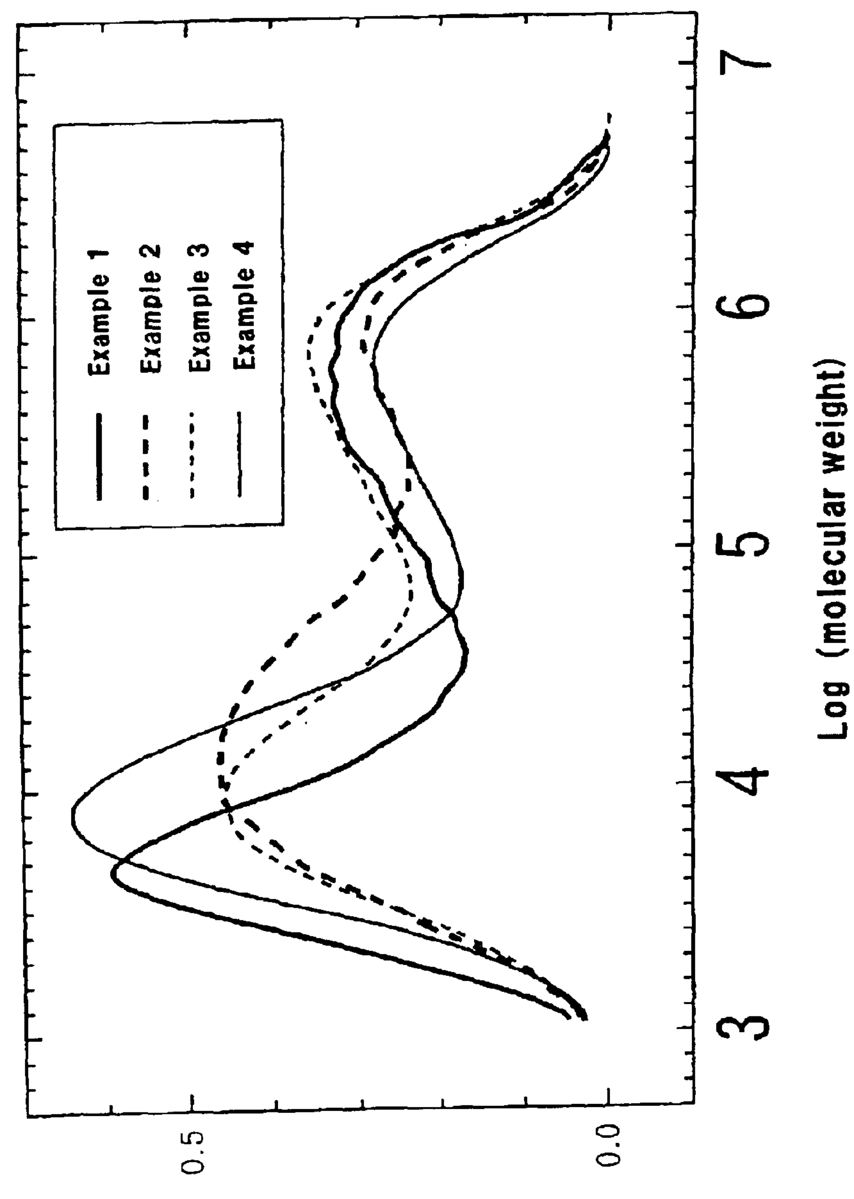
FIG. 1: GPC curves of ethylene polymers obtained in Examples 1 to 4

Now, the mode of carrying out the present invention will be explained below.

The ethylene polymer of the present invention is an ethylene homopolymer or a copolymer of ethylene with an α-olefin having a carbon number of from 3 to 20. The α-olefin as a comonomer used may, for example, be propylene, butene-1, 3-methylbutene-1, 3-methylpentene-1, 4-methylpentene-1, hexene-1, octene-1, pentene-1, decene-1, tetradecene-1, hexadecene-1, octadecene-1 or eicosene-1. Further, a vinyl compound such as vinyl cyclohexane or styrene or its derivative may also be used. Such an α-olefin may be used alone or as a combination of at least two types. Among them, more preferred as the α-olefin is one having a carbon number of from 3 to 10 such as propylene, butene-1 or hexene-1. The ethylene polymer of the present invention is preferably an ethylene homopolymer. The ethylene homopolymer is a polymer produced by supplying ethylene alone as a monomer material to a reactor.

The proportion of ethylene and α-olefin in the above ethylene/α-olefin copolymer is preferably such that ethylene is from 90 to 100 wt % and α-olefin is from 0 to 10 wt %, more preferably ethylene is from 95 to 100 wt % and α-olefin is from 0 to 5 wt %. If the α-olefin content is higher than the above range, the rigidity of the ethylene polymer tends to decrease, such being unfavorable.

The ethylene polymer of the represent invention is characterized by satisfying the following conditions (1) to (4) as physical properties of the polymer.

[Physical Properties]

(1) Melt Index (HLMI)

The ethylene polymer of the present invention has a melt index (HLMI; unit: g/10 min) under a load of 21.6 kg at 190° C. of from 0.1 to 1000. If HLMI is less than 0.1, the extrudability tends to be poor, and surface roughing may occur at the time of parison formation in a case of blow molding, breaking by blowing may occur in a blow-up step, such being unfavorable, and if it exceeds 1000 drawdown tends to significantly occur, or the impact resistance tends to decrease, such being unfavorable. HLMI is preferably within a range of from 0.5 to 100. HLMI is more preferably within a range of from 1.0 to 100. HLMI is most preferably within a range of from 1.0 to 50.

Measurement of HLMI

It means one measured under a load of 21.6 kg at 190° C. in accordance with ASTM-D-1238-57T. Usually the melt index is measured under a load of 2.16 kg, however, the range of the melt index of the ethylene polymer of the present invention is from the limit of measurement or below (usually <0.01, i.e. the amount of flow in 10 minutes is less than 10 mg) to a level of 30, and accordingly, it is necessary to measure the value under a ten-time load so as to minimize the measurement error. An abbreviated expression of HLMI is employed in a sense of melt index under a high load.

In the condition (1), in order to control HLMI to a desired value, a method of increasing HLMI by making a chain transfer agent such as hydrogen in a proper amount as a molecular weight modifier be present in the polymerization system, a method of increasing HLMI by increasing the polymerization temperature, may, for example, be mentioned.

(2) Density (d)

The ethylene polymer of the present invention has a density (d) of from 0.935 to 0.985 (g/cm$^3$). If the density is less than 0.935, the rigidity tends to be low, such being unfavorable. Further, if the density is higher than 0.985, the impact resistance tends to decrease or ESCR tends to decrease, such being unfavorable. The above density is preferably from 0.945 to 0.980, more preferably from 0.950 to 0.975.

Measurement of Density

It is one measured by a density gradient tube method in accordance with JIS-K6760. For measuring the density, the ethylene polymer is subjected to press molding at a temperature of 190° C. to obtain a pressed sheet, which is subjected to annealing at a temperature of 100° C. for 1 hour, followed by cooling to room temperature at a rate of about 20° C./hr to obtain a sample, and the sample thus obtained is used.

In the condition (2), in order to control the density to a desired value, a method of copolymerizing the above-mentioned α-olefin or the like with ethylene to decrease the crystallinity thereby to control the density to a desired value, a method of decreasing the melt index to decrease the crystallinity thereby to decrease the density, a method of introducing a component having a high molecular weight to suppress progress of crystallization thereby to decrease the crystallinity and to decrease the density, may, for example, be employed.

(3) Relation Between Melt Index (HLMI) and Density (d)

Of the ethylene polymer of the present invention, the relation between HLMI and (d) satisfies the formula (i):

$$d \geqq 0.00900 \times \mathrm{Log}(HLMI) + 0.951 \quad \text{(i)}$$

In the formula (i), Log represents a common logarithm. It is known that with respect to the ethylene polymer, the higher the molecular weight, i.e. the smaller HLMI, the more the density decreases in general. Further, "Creation of new generation highly functional polymers and recent catalyst technology" (edited by Minoru Terano, published by Gijyutsu Kyoiku Shuppan, Limited, publication data: May 2001) on page 128 discloses that "no high density polymer can be produced with a conventional m-PE, which can be produced with ZN-PE". However, the present inventors have succeeded in producing an ethylene copolymer having a higher density as compared with a conventionally known ethylene polymer in comparison at the same HLMI, by employing a specific metallocene catalyst and/or by employing a specific polymerization method to design a characteristic molecular weight distribution structure. The ethylene polymer of the present invention is greatly characterized by satisfying the formula (i) and in such a case, excellent mechanical properties will be obtained.

In the condition (3), in order that the relation between the density and HLMI satisfies the formula (i), physical properties which are inconsistent with a conventionally known correlation between HLMI and the density have to be satisfied simultaneously, which can be accomplished in the present invention by making a component having an adequately high melt viscosity to maintain a low HLMI value and an adequately highly crystalline component to maintain a high density value be present in predetermined proportions in the ethylene polymer of the present invention. By changing their proportions, the density and HLMI can be controlled within a range where the formula (i) is satisfied. The values of HLMI, the density, the flexural modulus and ESCR also change, and accordingly it is required to change their proportions within a range where the conditions (1) and (2) and the formula (ii) are satisfied.

In a case where the relation of the formula (i) is not satisfied, the rigidity may decrease, the impact resistance may decrease, ESCR may decrease or the creep characteristics may be poor, such being unfavorable. Excellent mechanical properties will be obtained when the relation between HLMI and the density satisfies the formula (i-1), more preferably when it satisfies the formula (i-2):

$$d \geqq 0.00697 \times \mathrm{Log}(HLMI) + 0.956 \quad \text{(i-1)}$$

$$d \geqq 0.00697 \times \mathrm{Log}(HLMI) + 0.957 \quad \text{(i-2)}$$

(4) Relation Between Environmental Stress Cracking Resistance (ESCR) and Flexural Modulus (M)

In general, the flexural modulus (M) and the common logarithm Log (ESCR) of the environmental stress cracking resistance are in inverse correlation. The ethylene polymer of the preset invention realizes both flexural modulus and ESCR at a high level which have conventionally been impossible to achieve, and satisfies the relation of the formula (ii):

$$M \geqq -7310 \times \mathrm{Log}(ESCR) + 32300 \quad \text{(ii)}$$

When copolymerization with an α-olefin is carried out with a purpose of improving mechanical strength of the molded product such as impact resistance and ESCR, conventionally the density of the copolymer is set to be relatively low, whereby there is such a drawback that the flexural modulus (rigidity) tends to decrease. Particularly in order to make the product light and thin, the decrease in rigidity may cause deformation such as distortion, or the decrease in the melting point makes the product be likely to undergo heat deformation, such being in an inadequate condition.

The ethylene polymer of the present invention which satisfies the relation of the formula (ii) has an extremely high rigidity. Thus, when it is used for a molded product such as a large container or a pipe, deformation such as distortion is less likely to occur, it is possible to make the product thin as compared with a conventional one, and further, it has a high ESCR and it is thereby excellent in chemical resistance and weather resistance, such being extremely effective in practical use.

In the condition (4), in order that the relation between the flexural modulus (M) and the environmental stress cracking resistance (ESCR) satisfies the formula (ii), it can be achieved by controlling the amount of the highly crystalline component and the number of so-called tie molecules, because the amount of the highly crystalline component affects the value of the flexural modulus, and the tie molecules affect the strength of the amorphous part. A tie molecule is a molecule which is present on both one crystal lamella and another crystal lamella. Generally, a component having a higher molecular weight is more likely to be a tie molecule. The values of HLMI and the density also change, and accordingly it is necessary to carry out the change within a range where the conditions (1) and (2) and the formula (i) are satisfied.

When the relation of the formula (ii) is not satisfied, mechanical properties tend to decrease, such being unfavorable. An ethylene polymer having a flexural modulus of at least 15000 kgf/cm$^2$ is extremely useful for all applications. An ethylene polymer having ESCR of at least 500 hours is extremely useful for applications in which chemical resistance and light resistance are particularly required. It is more preferred that the relation between the flexural modulus and ESCR satisfies the formula (ii-1), furthermore preferably it satisfies the formula (ii-2). Most preferably, it satisfies the formula (ii-3):

$$M \geqq -7310 \times \mathrm{Log}(ESCR) + 34000 \quad \text{(ii-1)}$$

$$M \geqq -7310 \times \mathrm{Log}(ESCR) + 35300 \quad \text{(ii-2)}$$

$$M \geqq -7310 \times \mathrm{Log}(ESCR) + 37000 \quad \text{(ii-3)}$$

Measurement of ESCR

It is measured at 50° C. in accordance with JIS-K6760. As a surfactant, a 10 wt % aqueous solution of LIPONOX NC (trade name, manufactured by LION CORPORATION) is used. The notch depth is 0.3 mm.

Measurement of Flexural Modulus

It is carried out by means of a three point bending method in accordance with JIS-K7203. The specification and the molding method of the test piece used, and the test conditions are as follows.

[Specification of Test Piece]

Length: at least 80 mm

Width: 25±0.5 mm

Thickness: 2±0.2 mm

[Molding Method of Test Piece]

A pressed sheet is molded from pellets in accordance with the following (1) to (5).

(1) Standing in a pressing machine at 170±5° C. for 5 minutes (2) Deaeration for 20 seconds (3) Pressurizing for 1 minute (60 kgf/cm$^2$ (588N/cm$^2$))

(4) Pressurizing by a pressing machine at 100±2° C. for 5 minutes (60 kgf/cm$^2$ (588N/cm$^2$))

(5) Pressurizing by a pressing machine at 30±2° C. for 5 minutes (60 kgf/cm$^2$ (588N/cm$^2$))

[Test Conditions]

Distance between supporting points: 35.0 mm

Testing rate: 1.0 mm/min

Support radius: 2±0.2 mm

The load is measured when the bending amount is 2.0 mm.

In order that the above physical properties of the ethylene polymer of the present invention are achieved, the following condition (5) is preferably satisfied in addition to the above conditions (1) to (4).

(5) The Relation Between the Molecular Weight (M1max) at the Highest Peak Position in the Molecular Weight Distribution Curve as Measured by Gel Permeation Chromatography (GPC) and the Melt Index Under a High Load (HLMI) Satisfies the Formula (iii)

$$\mathrm{Log}(M1\mathrm{max}) \leqq -0.307 \times \mathrm{Log}(HLMI) + 4.87 \quad \text{(iii)}$$

In the formula (iii), Log represents a common logarithm. In general, GPC is a simple measuring method with relatively high accuracy for measuring the molecular weight distribution of a polymer containing components having a molecular weight of from about several hundreds to about several million. On the other hand, HLMI is measured under a high load, and is one of measuring methods by which fluidity of a polymer at the time of melting can be known most simply, even if the polymer contains a considerable amount of components having a molecular weight exceeding a million i.e. so-called ultrahigh molecular weight components.

M1max represents a molecular weight with the highest proportion in the molecular weight distribution of the polymer as measured by GPC, and is an index which controls polymer physical properties regarding the molecular weight. The ethylene polymer of the present invention preferably has at least two components of a main peak component with a narrow molecular weight distribution having a highest peak position at the low molecular weight side of at most 200,000, preferably at most 50,000, furthermore preferably at most 20,000, most preferably less than 10,000, and a high molecular weight component with a broad peak which covers the high molecular weight side exceeding 1,000,000, preferably 2,000,000, more preferably 3,000,000, most preferably 4,000,000, in the molecular weight distribution curve as obtained by GPC measurement, whereby not only the polymer is excellent in mechanical properties but also its molding processability improves. Further, when the relation of the formula (iii) is satisfied, improvement in melt fluidity (easy-extrudability) due to contribution by the main peak component having a low molecular weight with a narrow molecular weight distribution represented by Mlmax and improvement in mechanical properties such as impact resistance due to contribution by the high molecular weight component represented by HLMI, are simultaneously realized. On the other hand, if the relation of the formula (iii) is not satisfied, the melt fluidity tends to deteriorate or mechanical strength such as impact resistance tends to deteriorate in some cases.

By using the value as defined hereinafter which simply represents the degree of narrowness of the molecular weight distribution of the main peak component with a narrow molecular weight distribution on the low molecular weight side, the characteristics of the ethylene polymer of the present invention can be defined more clearly. Namely, when the molecular weight at the point where a line which passes a point which divides a perpendicular drawn from the main peak position of the GPC curve to the base line in half, and which is parallel to the base line, and the GPC curve intersect with each other at the low molecular weight side, is M1/2, the ratio of M1/2 to M1max is at least 0.10, preferably at least 0.20, more preferably at least 0.30, most preferably at least 0.35.

In the condition (5), in order that the relation between M1max and HLMI satisfies the formula (iii), it is required that the main component consisting of the low molecular weight polymer with a low molecular weight distribution and the above-described component having an adequately high melt viscosity to maintain a low HLMI value, are contained in an appropriate mixture ratio in the ethylene polymer to optimize the molecular weight distribution. The values of HLMI, the density, the flexural modulus and ESCR also change, and accordingly it is required to carry out the change within a range where the conditions (1) and (2), the formula (i) and the formula (ii) are satisfied.

Here, although M1max of the polymer is low as compared with the conventional ethylene polymer, it shows a low HLMI. As mentioned above, the ethylene polymer of the present invention has a broad molecular weight distribution with a low molecular weight component and a high molecular weight component, and the Q value (Mw/Mn) which is the ratio of the weight average molecular weight (Mw) and the number average molecular weight (Mn) as obtained by GPC measurement which is commonly employed as a measure of the width of the molecular weight distribution, is preferably higher than 7, more preferably higher than 14, furthermore preferably higher than 17.

The relation between the molecular weight (M1max) at the highest peak position in the molecular weight distribution curve as measured by GPC and HLMI of the ethylene polymer of the present invention more preferably satisfies the formula (iii-1), most preferably it satisfies the formula (iii-2):

$$\mathrm{Log}(M1\mathrm{max}) \leqq -0.307 \times \mathrm{Log}(HLMI) + 4.60 \quad \text{(iii-1)}$$

$$\mathrm{Log}(M1\mathrm{max}) \leqq -0.307 \times \mathrm{Log}(HLMI) + 4.50 \quad \text{(iii-2)}$$

The lower limit of M1max is 1000, preferably 2000, more preferably 3000. If M1max is lower than the above lower limit, the amount of a low molecular weight polymer tends to increase, whereby the impact resistance tends to decrease, smoking at the time of molding or stain in the molding machine tends to be significant, or the surface of the product tends to be sticky, thus impairing the taste or smell when used as a food container, such being unfavorable.

Molecular Weight Measurement by GPC

Mw/Mn is obtained as calculated as Mw and Mn by means of a universal method, using the standard polystyrene of which the molecular weight is known. For measurement, IOSC-ALC/GPC manufactured by Waters K.K. is employed, three AD80-M/S manufactured by SHOWA DENKO K.K. are employed as columns, a sample is dissolved in o-dichlorobenzene to obtain a 0.2 wt % solution and 200 μm thereof is used, and measurement is carried out at 140° C. at a flow rate of 1 ml/min.

In order that the above physical properties of the ethylene polymer of the present invention are achieved, the following condition (6) is preferably satisfied in addition to the above conditions (1) to (5).

(6) Relation Between the Melting Point (Tm) as Obtained by Differential Scanning Calorimetry (DSC) Measurement and the Density (d) Satisfies the Formula (iv)

$$Tm \leqq 538d - 378 \quad \text{(iv)}$$

The melting point (Tm) as obtained by DSC measurement in the present invention means the main peak temperature (° C.) in the endothermic curve. The ethylene polymer of the present invention has a low melting point as compared with a conventionally known ethylene polymer having the same density, and when the relation of the formula (iv) is satisfied, it is excellent in fusing properties at the time of molding and mechanical strength of the molded product, particularly it is very excellent in balance between the flexural modulus (rigidity) and ESCR. This is estimated to be due to the fact that the ethylene polymer of the present invention contains a component which has extremely high crystallization speed and fusion speed.

Of the ethylene polymer of the present invention, the relation between Tm and d more preferably satisfies the formula (iv-1), most preferably the formula (iv-2):

$$Tm \leqq 538d - 379 \quad \text{(iv-1)}$$

$$Tm \leqq 538d - 380 \quad \text{(iv-2)}$$

Further, as one of preferred conditions of the ethylene polymer of the present invention to prevent thermal deformation of products (to improve heat resistance), the relation between Tm and d satisfies the formula (v):

$$Tm \geqq 400d - 250 \quad \text{(v)}$$

The relation between the melting point (Tm) as obtained by DSC measurement and the heat quantity of fusion (ΔH) of the ethylene polymer of the present invention satisfying the formula (vi) may be mentioned as one of preferred conditions. The unit of the heat quantity of fusion is J/g.

$$\Delta H \geqq 5.47Tm - 528 \quad \text{(vi)}$$

In the condition (6), in order that the relation between the melting point Tm and the density (d) satisfies the formula (iv), the molecular weight distribution and the copolymer composition distribution of the ethylene polymer are optimized to control the crystallinity distribution. Specifically, it can be achieved by controlling the content of a polymer component with a low comonomer content having a low molecular weight as a highly crystalline component.

Melting Point Measurement by DSC

It is carried out in accordance with JIS-K7121. 9 mg of a sample is melted at 160° C. for 10 minutes, the temperature is lowered to 40° C. at a rate of 10° C./min, the sample is held for 2 minutes, and then a fusion curve is measured up to 160° C. at a temperature-raising rate of 10° C./min, and the peak top temperature (° C.) is taken as the melting point (Tm).

Measurement of Heat Quantity of Fusion by DSC

It is calculated in accordance with JIS-K7122 and is represented by the unit J/g.

In order that the above physical properties of the ethylene polymer of the present invention are achieved, it is preferred that the following condition (7) is satisfied in addition to the above conditions (1) to (6).

(7) The Weight Percentage (Mc Value) of a Component Having a Molecular Weight of at Least 1,000,000 as Obtained from GPC-Malls Measurement is at Least 5%

If the Mc value is low, uniform extensibility or drawdown resistance at the time of blow molding tends to deteriorate, or the impact resistance strength tends to decrease, such being unfavorable. The range of the Mc value is more preferably at least 7%, particularly preferably at least 10%.

A so-called ultrahigh molecular weight component having a molecular weight of at least 1,000,000 has a large inertia radius of molecules in a molten state, and has an extremely low mobility, whereby it is likely to be incorporated into between different crystal lamellae in the process of crystallization. Namely, it is likely to be present in the polyethylene solid as a tie molecule. Accordingly, an ethylene polymer having a high Mc value which represents the weight percentage of a ultrahigh molecular weight component is likely to form a polyethylene solid with a large number of tie molecules, and as a result, it tends to have excellent mechanical properties such as improved impact resistance and improved ESCR.

The above Malls measurement is an abbreviation for multi angle laser light scattering. The upper limit of the Mc value is not particularly limited, however, if it is too high, the melt fluidity tends to be poor, and accordingly it is preferably 30%, more preferably 25%, furthermore preferably 20%.

In the condition (7), in order that the Mc value is within the above range, an operation to increase the proportion of the ultrahigh molecular weight component in the ethylene polymer is carried out. At this time, the value of HLMI also changes, and accordingly it is required to change the proportion within a range where the formulae (i) and (iii) are satisfied.

GPC-Malls Measurement and Definition of Mc Value

It is obtained by subjecting data obtained by the measuring apparatus under conditions by calibration as mentioned in (1) to data processing as mentioned in (2).

(1) Data Measurement

[Apparatus]

GPC: 150 CV (including RI detector) manufactured by Waters K.K.

Malls: DAWN·DSP (flow cell: F2 cell) manufactured by Wyatt.

(Data processing soft: ASTRA Version 4.50 manufactured by Wyatt)

[Conditions]

Column: Shodex UT-806M (two columns) manufactured by SHOWA DENKO K.K.

Solvent: 1,2,4-trichlorobenzene containing 0.2 w/v % BHT (Wako Pure Chemicals Industries, Ltd., HPLC grade)

Flow rate: 0.5 ml/min (as corrected as elution volume of BHT in the measurement sample in practice)

Measurement temperature: 140° C. (injection part, column part, detector (RI and DAWN) part)

Injection amount: 0.3 ml

Sample concentration: 2 mg/ml

Sample preparation: A sample solution is heated for dissolution in an air bath set at 140° C. for from 3 to 5 hours.

[Calibration]

NIST·SRM-1483 is employed as an isotropic scattering substance for sensitivity correction of each detector of the Malls.

The delay volume between the Malls and the RI detector is measured by using the standard polystyrene (F10) manufactured by TOSOH CORPORATION.

As the refractive index of the solvent and the Rayleigh ratio, 1.502 and $3.570\times10^{-5}$ are employed, respectively.

(2) Calculation of Mc Value

In a chromatogram employing a Rayleigh ratio having a scattering angle extrapolated to 0°, as obtained from the above measured data, the area percentage (Mc value) (%) of a component having a molecular weight of at least 1,000,000 of the chromatogram is obtained from the following calculation.

The all area detected as peaks in the chromatogram of 90° scattering of the Malls is designated as the calculation object, and the molecular weight is calculated by employing a data processing soft ASTRA. As the calculation method, injection weight, dn/dc (−0.104 ml/g) and Zimm plot (first approximation) are employed. The Rayleigh ratio $R(0)_i$ having a scattering angle of each eluted component separated by GPC extrapolated to 0° is calculated from the following formula (1):

$$R(0)_i=K\times c_i\times M_i \quad (1)$$

wherein $c_i$ and $M_i$ are the concentration and the molecular weight of the eluted component i obtained by calculation by employing the data processing soft ASTRA, respectively, and K is the optical constant calculated by the formula (2):

$$K=\{4\pi^2\times n^2\times(dn/dc)^2\}/\{\lambda^4/NA\} \quad (2)$$

π: circular constant=3.141 n: refractive index under the measurement condition of the solvent=1.502 dn/dc: refractive index concentration increment under the measurement condition of the sample=−0.104 (ml/g)

λ: wavelength of the light source in a vacuum=$632.8\times10^{-7}$ (cm)

NA: Avogadro's number=$6.022\times10^{23}$ (/mol), whereby K=$9.976\times10^{-8}$ (cm$^2$·mol/g$^2$).

On the other hand, the elution volume V (1M) at a molecular weight of 1,000,000 is read from the relational line of the molecular weight of each eluted component as obtained from the above-described Zimm plot and the elution volume, and the area percentage of the high molecular weight component of at least V (1M) in the chromatogram of the elution volume and $R(0)_i$ is calculated.

Molding Processability

The application in which characteristics of the ethylene polymer of the present invention having excellent mechanical properties represented by rigidity, impact resistance and ESCR which have not conventionally been achieved, are most remarkably obtained, may, for example, be injection-molded products such as various pipes for gas and for water supply and the like, films, and food goods and miscellaneous daily goods, rotational-molded products, compressive injection-molded products, extrusion-molded products, blow-molded products of various sizes, including small containers used for e.g. food oil, detergents and cosmetics, medium size containers for industrial chemical cans and coal oil cans, and large containers such as metal drums and fuel tanks for automobiles, and blow-molded products. In recent years, from the viewpoint of resource saving, labor saving and cost saving, requirement of furthermore weight saving and complicated shape of polyethylene products are increasing. In order to meet such requirements, excellent molding processability and forming properties are required as well as excellent mechanical properties.

As the molding of a polyethylene resin is usually carried out in a molten state of the resin, various behaviors in a molten state are important. Various behaviors of the ethylene polymer of the present invention in a molten state are extremely characteristic and as a result, the ethylene polymer which satisfies the above-described physical property definition has not only mechanical properties but also excellent moldability. The moldability is superior when at least one of the following conditions (8) to (13) is satisfied.

(8) Melt Elongation Ratio (R)

The ethylene polymer of the present invention preferably has a melt elongation ratio (R) of at least 3.5, which represents the limit of deformation speed at which elongating is possible without rupture when elongating deformation is applied in a molten state.

In the condition (8), in order that that R satisfies the above range, the molecular weight distribution and the degree of long chain branching are controlled to optimize the viscoelastic behaviors.

An ethylene polymer is molded usually in a molten state. Particularly when molding with a melt elongating (extension) step such as blow molding or film molding (blown-film molding) is carried out, it is important to prevent rupture or breaking by blowing in the elongating step, and the limit of the deformation speed at which elongating is possible has to be high, that is, R has to be high.

The ethylene polymer of the present invention is greatly characterized by having a high R as compared with a conventionally known ethylene polymer, and when R is at least 3.5, excellent molding processability will be obtained. If R is less than 3.5, rupture or breaking by blowing tends to occur in the step of melt elongating, such being unfavorable. More particularly, as R is dependent on molecular weight, it is preferred that:

(a) R satisfies the following formula (vii) when HLMI<8.0:

$$R \geqq -63.1 \times \mathrm{Log}(HLMI)+62.7 \tag{vii}$$

(b) R is at least 5.7 when HLMI≧8.0.

Measurement of R

By using capirograph manufactured by Toyo Seiki Seisaku-Sho, Ltd., a measurement sample is extruded from an orifice with a nozzle size of 1.0 mmϕ, a nozzle length of 10 mm and an inlet angle of 90° at a temperature of 190° C. (extrusion linear velocity (V0): 1.82 m/min), and the molten strand is subjected to a draw test at a draw rate (V). V is 1.3 m/min at the beginning, and then it is increased at a rate of 40 m/min, and V when the molten strand is ruptured is taken as Vk, and the ratio of Vk to V0 i.e. Vk/V0 is taken as the melt elongation ratio R.

(9) Relation Between the Melt Drawdown Index (Lm) and HLMI

Of the ethylene polymer of the present invention, the relation between HLMI and the melt drawdown index (Lm) which represents the draw ratio when a load is applied to the molten strand extruded from an orifice and the strand is left to stand for a certain time, satisfies the following formula (viii):

$$Lm \leqq 0.238 \times \mathrm{Log}(HLMI)+1.32 \tag{viii}$$

The lower limit of Lm is 0.950, preferably 0.980, more preferably 1.00.

In a case where the ethylene polymer is subjected to blow molding or extrusion, sagging (drawdown) due to its own weight and deformation occurs on the molten resin in a state extruded from the molding die, thus impairing the thickness and shape of the molded product. Particularly in the field of blow molding for large products such as fuel containers such as plastic fuel tanks for automobiles and metal drums, the weight of the molding precursor (parison) before blow-up reaches from several kg to several tens kg, and accordingly the sagging due to its own weight has to be particularly small (that is, the drawdown resistance has to be excellent).

Measurement of Lm

One having a laser scanning swell measuring apparatus mounted on capirograph manufactured by Toyo Seiki Seisaku-Sho, Ltd. is employed. A measurement sample which is preheated at a temperature of 230° C. for 15 minutes after packing is extruded from an orifice with a nozzle size of 2.78 mmϕ, a nozzle length of 80 mm and an inlet angle of 3.74° at a rod rate of 15 mm/min. To the section with an initial length (L0) below the die of 30 mm of the molten strand, a load of 8 KPa is applied. The length L (mm) at the time of t=30 seconds, at the section where L0=30 mm at the time of t=0 second, is measured, where the time at the beginning of application of the load is t (sec)=0. The ratio of L to L0, i.e. the rate of elongation L/L0 is defined as the melt drawdown index Lm.

In the condition (9), in order that the relation between Lm and HLMI satisfies the formula (viii), the molecular weight distribution and the degree of long chain branching are controlled to optimize the viscoelastic behaviors.

(10) Relation Between the Melt Elongation ratio (R) and the Melt Tension (MT)

Of the ethylene polymer of the present invention, the relation between the R value under the above condition (8) and the melt tension (MT) measured at 190° C. preferably satisfies the following formula (ix), whereby more excellent molding characteristics will be obtained:

$$R \geqq 35.5 \times \mathrm{Log}(MT)-22.2 \tag{ix}$$

Measurement of MT

By using a melt tension tester manufactured by Toyo Seiki Seisaku-Sho, Ltd., measurement is carried out under conditions of a nozzle size of 1.0 mmϕ, a nozzle length of 5 mm, an inlet angle of 90°, at a temperature of 190° C., at an extrusion rate of 0.44 g/min, at a draw rate of 0.94 m/min, with a distance of 40 cm from the die outlet to the V pulley lower end of the tension detector. The draft ratio (draw rate/nozzle linear velocity) is 1.25.

In the condition (10), in order that the relation between R and MT satisfies the formula (ix), the molecular weight distribution and the degree of long chain branching are controlled to optimize the viscoelastic behaviors.

(11) Swell Ratio

The swell ratio is preferably at most 1.8, whereby significant swell of the molten resin extruded from a die at the time of molding can be prevented, whereby it will not be difficult to control the size of the product. If the swell ratio is higher than 1.8, it will be necessary to control a special die gap, or no product having the dimension controlled with high accuracy will be obtained, such being unfavorable. The swell ratio is more preferably at most 1.6, furthermore preferably at most 1.5. The lower limit is 1.0.

Measurement of Swell Ratio

The ratio of the strand outer diameter to the nozzle size when a measurement sample is extruded from an orifice with a nozzle size of 1.0 mmϕ, a nozzle length of 10 mm and an inlet angle of 90° at a temperature of 190° C. at an extrusion linear velocity (V0) of 1.82 m/min, using capirograph manufactured by Toyo Seiki Seisaku-Sho, Ltd., is taken as the swell ratio.

In the condition (11), in order that the swell ratio is within the above range, the molecular weight distribution and the degree of long chain branching are controlled to optimize the viscoelastic behaviors.

The above-described excellent properties regarding the moldability are considered to be explained by the specific melt viscoelastic behaviors as represented by G' and η as described hereinafter.

(12) Storage Modulus (G's)

Of the ethylene polymer of the present invention, the relations of the storage modulus [G's (ω=0.1)] (unit Pa) with a short frequency (ω) of 0.1 rad/sec and the storage modulus [G's (ω=1.0)] (unit: Pa) with a long frequency (ω) of 1.0 rad/sec, at 190° C., and HLMI, satisfy the following formulae (x) and (xi), respectively:

$$\text{Log}[G's(\omega=0.1)] \geqq -0.374\times\text{Log}(HLMI)+4.35 \quad \text{(x)}$$

$$\text{Log}[G's(\omega=1.0)] \geqq -0.135\times\text{Log}(HLMI)+4.62 \quad \text{(xi)}$$

An ethylene polymer is molded usually in a molten state. Particularly when molding with a melt elongating (extension) step such as blow molding or film molding (blown-film molding) is carried out, it is important to prevent rapture or breaking by blowing in the elongating step, and the limit of the deformation speed at which elongating is possible has to be high.

The ethylene polymer of the present invention is characterized by having high G's (ω=0.1) and G's (ω=1.0) which satisfy the formulae (x) and (xi) as compared with a conventionally known ethylene polymer, and is excellent in melt elongating property and molding processability as represented by drawdown resistance and swell. If G's (ω=0.1) or G's (ω=1.0) does not satisfy the above range, rupture or breaking by blowing may occur in the melt elongating step, or the drawdown at the time of molding tends to be significant, whereby it tends to be difficult to control the shape of the product after blow-up, or the swell tends to be significant, whereby it will be necessary to control a special die gap, or no product having the dimension controlled with high accuracy will be obtained, such being unfavorable.

In order to make the product thin with a purpose of weight saving or in order to impart a complicated shape, G's (ω=0.1) and G's (ω=1.0) more preferably satisfy the following formulae (x-1) and (xi-1), respectively:

$$\text{Log}[G's(\omega=0.1)] \geqq -0.374\times\text{Log}(HLMI)+4.43 \quad \text{(x-1)}$$

$$\text{Log}[G's(\omega=1.0)] \geqq -0.135\times\text{Log}(HLMI)+4.69 \quad \text{(xi-1)}$$

Furthermore preferably, they satisfy the following formulae (x-2) and (xi-2), respectively:

$$\text{Log}[G's(\omega=0.1)] \geqq -0.374\times\text{Log}(HLMI)+4.56 \quad \text{(x-2)}$$

$$\text{Log}[G's(\omega=1.0)] \geqq -0.135\times\text{Log}(HLMI)+4.74 \quad \text{(xi-2)}$$

Further, G's (ω=10) preferably satisfies the following formula, whereby the ethylene polymer will be excellent in prevention of rupture or breaking by blowing in the elongating step or is excellent in drawdown resistance at the time of molding in some cases:

$$\text{Log}[G's(\omega=10)] \geqq -0.309\times\text{Log}(HLMI)+5.25$$

The upper limits of G's (ω=0.1), G's (ω=1.0) and G's (ω=10) are not particularly limited, however, if they are too high, the melt elasticity tends to be too high, thus impairing the molding processability, and accordingly they are preferably 0.1 MPa, 0.2 MPa and 0.3 MPa, respectively, more preferably 0.07 MPa, 0.15 MPa and 0.2 MPa, respectively, furthermore preferably 0.05 MPa, 0.12 MPa and 0.17 MPa, respectively.

In the condition (12), in order that the relations between the storage moduli G' and HLMI satisfy the formulae (x) and (xi), the molecular weight distribution and the degree of long chain branching are controlled.

Measurement of Storage Modulus G's

As a stress-detecting type rotational viscometer, RMS-800 manufactured by Rheometrics is employed. Measurement is carried out at a temperature of 190° C. with an angular frequency within a range of $\omega=3.981\times10^{-3}$ to $1.0\times10^{2}$ (rad/sec) to obtain G's (ω) at each ω. Measurement is carried out at three to six points per one digit of the frequency. The unit is represented by Pa.

(13) Relation Between the Melt Shear Viscosity and HLMI

Of the ethylene polymer of the present invention, the relation between the shear viscosity [$\eta e(\omega=3.981\times10^{-3})$] (unit: Pa·sec) at 190° C. with a frequency (ω) of $3.981\times10^{-3}$ rad/sec and HLMI satisfies the following formula (xii):

$$\text{Log}(\eta e) \geqq -0.531\times\text{Log}(HLMI)+6.35 \quad \text{(xii)}$$

More preferably it satisfies the following formula (xii-1):

$$\text{Log}(\eta e) \geqq -0.531\times\text{Log}(HLMI)+6.50 \quad \text{(xii-1)}$$

Further, ηe ($\omega=3.981\times10^{-3}$) is preferably at least 0.3 Mpa·sec, more preferably at least 0.6 Mpa·sec, whereby an ethylene polymer having excellent elongating property, drawdown resistance, ESCR and impact resistance will be obtained.

In the condition (13), in order that the relation between ηe and HLMI satisfies the formula (xii), the molecular weight distribution and the degree of long chain branching are controlled.

Production Method

The physical properties of the ethylene polymer of the present invention are explained above. Now, a method for producing the ethylene polymer having the above-described physical properties will be explained below. The periodic law of atoms employed in the present specification is based on Group XVIII method as recommended by IUPAC in 1989.

In order to obtain an ethylene polymer which satisfies at least one condition selected from the conditions (1) to (4), or (1) to (4) and (5) to (13), it is necessary to select the catalyst, the polymerization condition and the polymerization process carefully. For example, in a case where a known traditional Ziegler catalyst, traditional Cr catalyst, metallocene catalyst or single site catalyst comprising a transition metal of Group III to XI of the Periodic Table as a center metal is employed, a conventionally known multistage polymerization method which comprises multistage polymerization steps with different polymerization conditions such as the ethylene partial pressure, the hydrogen concentration, the comonomer concentration and the temperature, or a multistage polymerization method which comprises using a metallocene catalyst as disclosed in JP-A-10-245418 may be referred to.

In a case where a metallocene catalyst is employed, production is carried out preferably by homopolymerizing ethylene or copolymerizing ethylene with an α-olefin such as 1-butene, 1-hexene or 1-octene, in the presence of a catalyst system containing the following components [A] and [B], and [C] as the case requires.

[A] A transition metal compound of Group IV to VI of the Periodic Table having at least one conjugated five-membered cyclic ligand

[B] Ion exchangeable layered silicate

[C] Organic aluminum compound

Component [A]

The component [A] used for the catalyst of the present invention is a transition metal compound of Group IV to VI of the Periodic Table containing at least one conjugated five-membered cyclic ligand. Preferred as the transition metal compound is a compound of the following formula [1], [2], [3] or [4]:

[1]

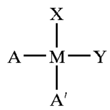

[2]

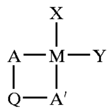

[3]

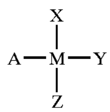

[4]

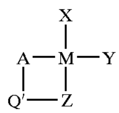

[wherein each of A and A' is a ligand having a conjugated five-membered cyclic structure (A and A' may be the same or different in the same compound), Q is a binding group which crosslinks two conjugated five-membered cyclic ligands at an optional position, Z is a ligand containing a nitrogen atom, an oxygen atom, a silicon atom, a phosphorus atom or a sulfur atom, or a hydrogen atom, a halogen atom or a hydrocarbon group, which is bonded to M, Q' is a binding group which crosslinks a conjugated five-membered cyclic ligand at an optional position and Z, M is a metal atom selected from Groups IV to VI elements of the Periodic Table, and each of X and Y is a hydrogen atom, a halogen atom, a hydrocarbon group, an alkoxy group, an amino group, a phosphorus-containing hydrocarbon group or a silicon-containing hydrocarbon group, which is bonded to M].

Each of A and A' is a conjugated five-membered cyclic ligand, and they may be the same or different in the same compound, as mentioned above. As a typical example of the conjugated five-membered cyclic ligand (each of A and A'), a conjugated carbon fiver-membered cyclic ligand i.e. a cyclopentadienyl group may be mentioned. The cyclopentadienyl group may be one having five hydrogen atoms [$C_6H_5$], or may be its derivative, i.e. one having some of its hydrogen atoms substituted with substituents. One specific example of the substituent is a hydrocarbon group having a carbon number of from 1 to 20, preferably from 1 to 12, and the hydrocarbon group may be bonded to a cyclopentadienyl group as a monovalent group, or in a case where a plurality of the hydrocarbon groups are present, two of them may be bonded at the respective other edges (ω-edges) to form a ring together with a part of the cyclopentadienyl group. The representative example of the latter is a condensed six-membered ring formed by two substituents bonded at the respective ω-edges with two adjacent carbon atoms of the cyclopentadienyl group, i.e. an indenyl group, a fluorenyl group or an azulenyl group.

Accordingly, the typical example of the conjugated five-membered cyclic ligand (each of A and A') is a substituted or non-substituted cyclopentadienyl group, indenyl group or fluorenyl group.

As the substituent of the cyclopentadienyl group, in addition to the above hydrocarbon group having a carbon number of from 1 to 20, preferably from 1 to 12, a halogen group (such as fluorine, chlorine or bromine), an alkoxy group (such as one having a carbon number of from 1 to 12), a silicon-containing hydrocarbon group (such as a group having a carbon number at a level of from 1 to 24 and containing a silicon atom in the form of —Si($R^1$)($R^2$)($R^3$)), a phosphorus-containing hydrocarbon group (such as a group having a carbon number at a level of from 1 to 18 and containing a phosphorus atom in the form of —P($R^1$)($R^2$)), a nitrogen-containing hydrocarbon group (such as a group having a carbon number at a level of from 1 to 18 and containing a nitrogen atom in the form of —N($R^1$)($R^2$)) or a boron-containing hydrocarbon group (such as a group having a carbon number at a level of from 1 to 18 and containing a boron atom in the form of —B($R^1$)($R^2$)), may be mentioned. If a plurality of such substituents is present, these substituents may be the same or different.

Q is a binding group which crosslinks two conjugated five-membered cyclic ligands at an optional position, and Q' is a binding group which crosslinks a conjugated five-membered cyclic ligand at an optional position and a Z group. Preferred is an alkylene group or a silylene group.

M is a metal atom selected from Groups IV to VI elements of the Periodic Table, preferably an atom of Group IV of the Periodic Table, specifically titanium, zirconium or hafnium.

Z is a ligand containing a nitrogen atom, an oxygen atom, a silicon atom, a phosphorus atom or a sulfur atom, or a hydrogen atom, a halogen atom or a hydrocarbon group, which is bonded to M.

Each of X and Y which may be the same or different, is selected from hydrogen, a halogen group and a hydrocarbon group having a carbon number of from 1 to 8. Each of them is particularly preferably halogen.

In the present invention, the component [A] may be a mixture of at least two compounds among the compound group of the same formula and (or) compounds of the different formulae.

Specific examples of the transition metal compound wherein M is zirconium are as follows.

(I) compounds of the formula [1], i.e. transition metal compounds having two conjugated five-membered cyclic ligands and having no binding group Q, such as (1) bis(cyclopentadienyl)zirconium dichloride, (2) bis(dimethylcyclopentadienyl)zirconium dichloride, (3) bis(pentamethylcyclopentadienyl)zirconium dichloride, (4) bis(n-butylcyclopentadienyl)zirconium dichloride, (5) bis(n-butyl-methyl-cyclopentadienyl)zirconium dichloride, (6) (cyclopentadienyl)(ethyl-methyl-cyclopentadienyl)zirconium dichloride, (7) (n-butylcyclopentadienyl)(dimethylcyclopentadienyl)zirconium dichloride, (8) bis(indenyl)zirconium dichloride, (9) bis(tetrahydroindenyl)zirconium dichloride, (10) bis(2-methylindenyl)zirconium dichloride, (11) bis(fluorenyl)zirconium dichloride, (12) bis(cyclopentadienyl)zirconium dimethyl, (13) (cyclopentadienyl)(indenyl)zirconium dichloride, (14) (cyclopentadienyl)(fluorenyl)zirconium dichloride and (15) (cyclopentadienyl)(azulenyl)zirconium dichloride.

(II) Compounds of the formula [2], such as (II-1) one wherein the binding group Q is an alkylene group, such as (1) methylenebis(indenyl)zirconium dichloride, (2) ethylenebis(indenyl)zirconium dichloride, (3) ethylenebis(4,5,6,7-tetrahydroindenyl)zirconium dichloride, (4) ethylenebis(2-methylindenyl)zirconium dichloride, (5) ethylene(2,4-dimethylcyclopentadienyl)(3',5'-dimethylcyclopentadienyl)zirconium dichloride, (6) ethylene 1,2-bis[4-(2,7-dimethylindenyl)]zirconium dichloride, (7) isopropylidenebis(indenyl)zirconium dichloride, (8) methylene(cyclopentadienyl)(3,4-dimethylcyclopentadienyl)zirconium dichloride, (9) isopropylidene (cyclopentadienyl)(3,4-dimethylcyclopentadienyl) zirconium dichloride, (10) isopropylidene (cyclopentadienyl)(fluorenyl)zirconium dichloride, (11) ethylene(cyclopentadienyl)(3,5-dimethylpentadienyl) zirconium dichloride, (12) ethylene(2,5-dimethylcyclopentadienyl)(fluorenyl)zirconium dichloride, (13) diphenylmethylene(cyclopentadienyl)(3,4-diethylcyclopentadienyl)zirconium dichloride, (14) cyclohexylidene(cyclopentadienyl)(fluorenyl)zirconium dichloride and (15) dichloro{1,1'-dimethylmethylenebis[2-methyl-4-(4-biphenyl)-4H-azulenyl]}zirconium.

(II-2) One wherein Q is a silylene group, such as (1) dimethylsilylenebis(2-methylindenyl)zirconium dichloride, (2) dimethylsilylenebis(2,4-dimethylindenyl)zirconium dichloride, (3) dimethylsilylenebis(2-methyl-4,5,6,7-tetrahydroindenyl)zirconium dichloride, (4) dimethylsilylenebis(2-methyl-4,5-benzoindenyl)zirconium dichloride, (5) dimethylsilylenebis(2-methyl-4-phenylindenyl)zirconium dichloride, (6) dimethylsilylenebis[4-(2-phenylindenyl)]zirconium dichloride, (7) dimethylsilylenebis[4-(2-phenyl-3-methylindenyl)]zirconium dichloride, (8) phenylmethylsilylenebis(4,5,6,7-tetrahydroindenyl) zirconium dichloride, (9) phenylmethylsilylene (2,4-dimethylcyclopentadienyl)(3',5'-dimethylcyclopentadienyl) zirconium dichloride, (10) diphenylsilylenebis(indenyl) zirconium dichloride, (11) tetramethyldisilylenebis (cyclopentadienyl)zirconium dichloride, (12) dimethylsilylene(cyclopentadienyl) triethylcyclopentadienyl)zirconium dichloride, (13) dimethylsilylene (cyclopentadienyl)(fluorenyl)zirconium dichloride, (14) dimethylsilylene (diethylcyclopentadienyl) (octahydrofluorenyl)zirconium dichloride and (15) dimethylsilylenebis[1-(2-methyl-4-phenyl-4H-azulenyl] zirconium dichloride.

(II-3) One wherein Q is a hydrocarbon group containing germanium, phosphorus, nitrogen, boron or aluminum, such as (1) dimethylgermaniumbis(indenyl)zirconium dichloride, (2) methylaluminumbis(indenyl)zirconium dichloride, (3) phenylphosphinobis(indenyl)zirconium dichloride and (4) phenylamino(cyclopentadienyl)(fluorenyl)zirconium dichloride.

(III) Compounds of the formula [3], i.e. transition metal compounds having one conjugated five-membered cyclic ligand and having no binding group Q', such as (1) pentamethylcyclopentadienyl-bis(phenyl)aminozirconium dichloride, (2) indenyl-bis(phenyl)amidezirconium dichloride, (3) pentamethylcyclopentadienyl-bis (trimethylsilyl)aminozirconium dichloride, (4) pentamethylcyclopentadienylphenoxyzirconium dichloride, (5) pentamethylcyclopentadienylzirconium trichloride and (6) cyclopentadienylzirconiumbenzyl dichloride.

(IV) Compounds of the formula [4], i.e. transition metal compounds having one conjugated five-membered cyclic ligand crosslinked by the binding group Q', such as (1) dimethylsilylene(tetramethylcyclopentadienyl) phenylamidezirconium dichloride, (2) dimethylsilylene (tetramethylcyclopentadienyl)tert-butylamidezirconium dichloride, (3) dimethylsilylene(indenyl) cyclohexylamidezirconium dichloride, (4) dimethylsilylene (tetrahydroindenyl)decylamidezirconium dichloride, (5) dimethylsilylene(tetrahydroindenyl) ((trimethylsilyl)amino) zirconium dichloride and (6) dimethylgermane (tetramethylcyclopentadienyl)(phenyl)amino zirconium dichloride.

(V) Further, compounds of the above (I) to (IV), wherein chlorine is replaced with e.g. bromine, iodine, hydride, methyl or phenyl may also be used.

In the above examples, di-substituted products of the cyclopentadienyl ring include 1,2- and 1,3-substituted products, and tri-substituted products include 1,2,3- and 1,2,4-substituted products.

Further, in the present invention, as the component [A], compounds having zirconium as the center metal of each of the zirconium compounds of the above (I) to (V) replaced with titanium, hafnium, vanadium, niobium, chromium, molybdenum, tungsten or the like may also be used. Among them, preferred are zirconium compounds, hafnium compounds and titanium compounds.

② Component [B]

The ion exchangeable layered silicate used as the component [B] in the present invention is a silicate compound having such a crystal structure that faces constituted by e.g. an ionic bond are parallelly overlaid one on another with a weak binding power, and wherein contained ions are exchangeable with one another.

As specific examples of the ion exchangeable layered silicate, known layered silicates as disclosed in e.g. "Nendo Kobutsugaku (Clay Mineralogy)" Haruo Shirouzu, Asakura Shoten (1995) may be employed, and among them, a smectite group including montmorillonite, sauconite, beidellite, nontronite, saponite, hectorite, stevensite, bentonite and taeniolite, a vermiculite group and a mica group are preferred, and a mica group and a smectite group are particularly preferred.

Representative examples of the smectite group generally include montmorillonite, beidellite, saponite, nontronite, hectorite and sauconite. Commercially available products such as "Benclay SL" (manufactured by MIZUSAWA INDUSTRIAL CHEMICALS, LTD.), "Kunipia" and "Smectone" (each manufactured by Kunimine Industries Co., Ltd.), "montmorillonite K10" (manufactured by Aldrich, manufactured by Jute Chemie) and "K-Catalysts series" (manufactured by Jute Chemie) may be utilized.

Representative examples of the mica group include white mica, palagonite, bronze mica, black mica and lepidolite. Commercially available products such as "synthetic mica Somasif" (manufactured by CO-OP CHEMICAL CO., LTD.), "fluorine bronze mica", "fluorotetrasilicic mica" and "taeniolite" (each manufactured by TOPY INDUSTRIES LIMITED) may also be utilized.

Further, the component [B] is preferably subjected to a chemical treatment. As the chemical treatment, either a surface treatment of removing impurities attached on the surface or a treatment which influences the crystal structure of the clay may be employed.

Preferred chemical treatment is a salt treatment and/or acid treatment. With respect to the catalyst for olefin polymerization obtained by combination of a layered silicate with a metallocene complex, the layered silicate can activate the metallocene complex. What is important is that the catalyst may be a multi site catalyst regarding the polymerization active site, by the structure of the layered silicate. Thus, the metallocene catalyst as a single site catalyst in a case where aluminoxane is used functions as a multi site catalyst. Accordingly, a polymer having a conventional molecular weight and a polymer having an ultrahigh molecular weight can be formed in a single polymerization. By the acid treatment, metal atoms contained in the layered silicate can be eluted, whereby specific active sites can be formed. On the other hand, by the salt treatment, cations present between layers can be exchanged, and the distance between layers can be changed depending upon the size of the cations exchanged, whereby the active precursor sites in the inside of the silicate can be contacted with the metallocene complex. By controlling the compound used, the treatment concentration, the treatment temperature and the like in such an acid treatment or salt treatment, the structure of the layered silicate after the treatment can be controlled.

In the present invention, it is necessary that at least 30%, preferably at least 40%, particularly preferably at least 60%, of the exchangeable cations contained in at least one compound selected from the group consisting of ion exchangeable layered silicates, before the treatment with a salt, are subjected to ion exchange with cations dissociated from the following salt. The salt used in the salt treatment of the present invention with a purpose of such an ion exchange is a compound containing cations containing at least one type of atoms selected from the group consisting of Group II to XIV atoms.

Such a salt may be used alone or in combination of at least two types simultaneously and/or continuously. To produce the ethylene polymer of the present invention, as the salt employed in the salt treatment, at least one type of a cation selected from the group consisting of the Groups IV to VI atoms and at least one type of an anion selected from anions of halogen atoms, inorganic acids and organic acids, is preferred, and among specific examples thereof, particularly preferred are the above-exemplified salts containing $Ti^{2+}$, $Ti^{3+}$, $Ti^{4+}$, $Zr^{2+}$, $Zr^{3+}$, $Zr^{4+}$, $Hf^{2+}$, $Hf^{3+}$, $Hf^{4+}$, $Cr^{2+}$, $Cr^{3+}$, $Cr^{4+}$, $Cr^{5+}$ or $Cr^{6+}$. Among these specific examples, most preferred are salts containing $Cr^{2+}$, $Cr^{3+}$, $Cr^{4+}$, $Cr^{5+}$ or $Cr^{6+}$.

By the acid treatment, a part or the whole of the cations of e.g. Al, Fe or Mg in the crystal structure are eluted, in addition to removal of impurities on the surface. The acid used in the acid treatment is preferably selected from hydrochloric acid, sulfuric acid, nitric acid, acetic acid and oxalic acid. Each of the salt and the acid used for the treatment may be a combination of at least two types. In a case where the salt treatment and the acid treatment are combined, a method of carrying out the salt treatment and then carrying out the acid treatment, a method of carrying out the acid treatment and then carrying out the salt treatment, or a method of carrying out the salt treatment and the acid treatment at the same time, may be mentioned.

The conditions of each of the treatments with the salt and the acid are not particularly limited, however, usually the salt or acid concentration is from 0.1 to 50 wt %, the treatment temperature is from room temperature to the boiling point, and the treatment time is from 5 minutes to 24 hours, and the treatment is preferably carried out under such a condition that at least part of the substance constituting at least one compound selected from the group consisting of ion exchangeable layered silicates is eluted. Further, the salt and the acid is employed usually as an aqueous solution, but the treatment may be carried out in an organic solvent such as acetone, ethanol, hexane or toluene depending on the circumstances.

The component [B] is preferably subjected to a granulation step from the viewpoint of improving the power property of the obtained polymer, and particularly preferably atomizing granulation is employed. The timing of the treatment may be either before or after the acid treatment and/or the salt treatment.

③ Component [C]

Further, in the present invention, as examples of an organic aluminum compound used as the component [C] as the case requires, the compound of the following formula may be mentioned:

$$AlR^8_jX_{3-j}$$

wherein $R^8$ is a hydrocarbon group having a carbon number of from 1 to 20, X is hydrogen, halogen or an alkoxy group, and j is a number of $0<j\leqq 3$.

Specific examples of the above organic aluminum compound include trialkylaluminum such as trimethylaluminum, triethylaluminum, tripropylaluminum, triisobutylaluminum and trioctylaluminum, and halogen- or alkoxy-containing alkyl aluminum such as diethylaluminum monochloride and diethylaluminum methoxide. Among them, trialkylaluminum is preferred, triethylaluminum or triisobutylaluminum is more preferred, and triethylaluminum is most preferred.

④ Preparation of Catalyst

In the present invention, it is preferred that ethylene is contacted with the above components [A] and [B] and the component [C] used as the case requires, for preliminary polymerization to obtain a catalyst. As the contact conditions of the component [A], the component [B] and the component [C] as the case requires, a known method may be employed.

⑤ Production of Ethylene Polymer

The homopolymerization reaction of ethylene or the copolymerization reaction with another olefin is carried out by using the above obtained solid catalyst component, preferably solid catalyst component preliminarily polymerized with ethylene. At this time, an organic aluminum compound may be used as the case requires. The organic aluminum compound used may be the same compound as the compound which can be used as the component [C]. As the amount of the organic aluminum compound, the molar ratio of the transition metal in the catalyst component [A] to aluminum in the organic aluminum compound is within a range of 1:0 to 10000. Particularly as the additional condition, the ratio of aluminum in the organic aluminum compound to the catalyst component [B] is selected to be from 4.0 to 100 mmol-Al/g-[B], whereby the ethylene polymer of the present invention having the above-described excellent physical properties can be obtained with a single catalyst in a single reactor without using a plurality of catalysts in combination or without a special method such as multistage polymerization.

The ratio of aluminum in the organic aluminum compound to the catalyst component [B] is more preferably from 10.0 to 80.0 mmol-Al/g-[B], most preferably from 20.0 to 60.0 mmol-Al/g-[B]. The aluminum concentration in the organic aluminum compound in the polymerization system is preferably from 0.20 to 5.00 mmol-Al/L-solvent, more preferably from 0.30 to 2.00 mmol-Al/L-solvent, most preferably from 0.40 to 1.00 mmol-Al/L-solvent, in the case of a slurry polymerization method.

In the present invention, the M1max can be controlled to be a desired value by increasing or decreasing the amount of hydrogen as a molecular weight modifier. On the other hand, as described above, the layered silicate subjected to a certain chemical treatment can form extremely small hydrogen-responsive sites in actuation of the metallocene complex, and as a result, an ultrahigh molecular weight ethylene polymer which is less likely to be influenced by the feed amount of hydrogen can be formed.

The ethylene polymer of the present invention can be produced by homopolymerizing ethylene or copolymerizing ethylene with another olefin, and it is preferably produced by homopolymerization of ethylene so as to obtain a polymer having particularly high rigidity among the ethylene polymers of the present invention.

The polymerization reaction is carried out in the presence or absence of an inert hydrocarbon such as butane, pentane, hexane, heptane, toluene or cyclohexane or a solvent such as liquid α-olefin. The temperature is from −50 to 250° C. and the pressure is not particularly limited, but is preferably within a range of from normal pressure to about 2000 kgf/cm$^2$. Further, hydrogen may be present as a molecular weight modifier in the polymerization system, and it is preferred as a modifier of the molecular weight, MI and HLMI. The preferred amount of hydrogen to obtain the ethylene polymer of the present invention having the above-described excellent physical properties is from 0.05 to 5.0 mol %, more preferably from 0.1 to 3.0 mol %, most preferably from 0.2 to 2.0 mol %, as the molar ratio based on ethylene in the vapor phase part of the slurry polymerization system of n-heptane solvent at a polymerization temperature of from 0 to 110° C. for example. Preferred as the polymerization method is a slurry polymerization method, a vapor phase polymerization method, a high pressure polymerization method or a solution polymerization method. More preferred is a slurry polymerization method or a vapor phase polymerization method, and most preferred is a slurry polymerization method.

The component having an adequately high melt viscosity to maintain a low HLMI value and the ultrahigh molecular weight component are produced preferably by homopolymerizing ethylene or copolymerizing ethylene with an α-olefin such as 1-butene, 1-hexene or 1-octene under the above-described conditions in the presence of the above-described catalyst system containing the catalyst components [A] and [B], and [C] as the case requires. At this time, it is important that the ratio of aluminum in the organic aluminum compound used for the polymerization reaction to the catalyst component [B] and the aluminum concentration of the organic aluminum compound in the polymerization system are within the above-described ranges.

Further, the adequately highly crystalline component to maintain a high density value and the low molecular weight component with a narrow molecular weight distribution to control M1max to be within a preferred range, may be produced by the above-described polymerization method in the presence of the above-described catalyst system. At this time, the polymerization temperature and the molar ratio of hydrogen present as the molecular weight modifier in the polymerization system to ethylene are important. Further, the crystallinity distribution may be controlled by appropriately selecting the type and the feed amount of the comonomer and the catalyst. In the case of ethylene homopolymerization, it is controlled by appropriately selecting the catalyst and by controlling the molecular weight distribution.

With the ethylene polymer of the present invention, an additive such as a weathering stabilizer, a heat-resisting stabilizer, an antistatic agent, a slipping agent, an anti-blocking agent, an anti-fogging agent, a lubricant, a pigment, a crystalline nucleus agent, an anti-aging agent, a hydrochloric acid absorbing agent or an antioxidant may be blended as the case requires within a range of not impairing the purpose of the present invention.

EXAMPLES

Now, the present invention will be specifically explained with reference to Examples. However, the present invention is by no means restricted to such specific Examples.

Measuring methods and definitions of the physical property values employed in the present invention are as described above. "%" represents "wt %" unless otherwise specified.

Example 1

(1) Chemical Treatment and Granulation of Clay Mineral 8 kg of commercially available montmorillonite ("Kunipia F", manufactured by Kunimine Industries Co., Ltd.) was pulverized by a vibrating ball mill and dispersed in 50 L of demineralized water having 10 kg of magnesium chloride dissolved therein, followed by stirring at 80° C. for 1 hour. The obtained solid component was washed with water, then dispersed in 56 L of a 8.2% hydrochloric acid aqueous solution, followed by stirring at 90° C. for 2 hours and washing with demineralized water. 4.6 kg of a water slurry liquid of montmorillonite thus chemically treated was adjusted to a solid content concentration of 15.2%, and subjected to spray drying by a spray dryer. The shape of particles obtained by granulation was spherical shape.

(2) Chromium Salt Treatment of Clay Mineral 80 g of commercially available $Cr(NO_3)_3.9H_2O$ was dissolved in 1000 g of pure water, then 200 g of the chemically treated montmorillonite granulated particles obtained in (1) were dispersed therein, followed by stirring at 90° C. for 3 hours. This dispersion was subjected to filtration and washed with demineralized water until pH became 6, then the obtained hydrated solid cake was preliminarily dried at 110° C. for 10 hours to obtain 237.1 g of particulate montmorillonite treated with chromium salt, the whole part of which had good flowability. 10.45 g of the preliminarily dried montmorillonite particles were further dried under reduced pressure at 200° C. for 2 hours to obtain 9.13 g of dry montmorillonite particles.

(3) Organic Al Treatment of Montmorillonite Treated with Chromium Salt 9.13 g of the montmorillonite particles treated with chromium salt obtained in (2) was dispersed in 10.8 ml of n-heptane in a 200 mL flask in an atmosphere of nitrogen to obtain a slurry. Then, 44.0 ml of a n-heptane solution of triethylaluminum (concentration: 0.622 mol/L) was added thereto at room temperature with stirring. After they were contacted at room temperature for 1 hour, the supernatant liquid was drawn out, and the solid part was washed with n-heptane.

(4) Catalyst Preparation and Preliminary Polymerization

In an atmosphere of nitrogen, 700 ml of n-heptane and the entire amount of the solid part obtained in (3) were introduced into a reactor having a capacity of 1 L equipped with an induction stirrer. 0.7304 mmol (0.2135 g) of bis (cyclopentadienyl)zirconium dichloride as a solution of 85.4 ml of n-heptane was added thereto, followed by stirring at 30° C. for 10 minutes. Then, 8.76 mmol (1.00 g) of triethylaluminum was added thereto, the temperature was raised to 60° C., and then stirring was continued further for 10 minutes. While keeping the temperature of the system, ethylene gas was introduced at a rate of 0.45 NL/min for 113 minutes to carry out preliminary polymerization. The supply of ethylene was terminated, and the entire content in the reactor was drawn out to a 2 L flask in an atmosphere of nitrogen. 500 mL of heptane was added to the reactor to draw out the entire content remaining in the reactor to the flask. The preliminarily polymerized catalyst slurry transferred to the flask was left to stand, and about 950 mL of the supernatant liquid was removed, and then the solvent was removed by drying under reduced pressure with heating at 70° C. As a result, 71.25 g of a preliminarily polymerized catalyst powder was recovered.

(5) Polymerization of Ethylene

Ethylene polymerization was carried out by using the preliminarily polymerized catalyst of the above (4). Namely, purified nitrogen was passed through the catalyst at 90° C. for adequate drying, and then in an agitated reactor having a capacity of 200 L replaced with ethylene gas, 100 L of n-heptane and 48.0 mmol of triethylaluminum were added at room temperature. After the internal temperature of the reactor was set to 90° C., a predetermined amount of hydrogen (pressure: 20.5 kg/cm$^2$, volume: 1090 ml) was introduced, then ethylene gas was introduced so that the pressure would be 20 KG. While maintaining the internal temperature and the pressure, 16.0 g of the preliminarily polymerized catalyst of the above (4) was added to initiate the polymerization of ethylene. Ethylene was supplied to always maintain a pressure of 20 KG during the polymerization, and the polymerization was continued for 5 hours. Hydrogen was added in an appropriate amount every one hour after initiation of the polymerization. The transition of hydrogen/ethylene ratio (mol %) at the vapor phase part in the reactor after initiation of the polymerization every 30 minutes was 1.096/0.969/0.802/1.105/0.931/0.881/0.766/0.808/0.713/0.669. As a result, 1.79 kg of a particulate ethylene homopolymer was obtained.

To 100 parts by weight of the obtained polyethylene, 0.1 part by weight of IRGANOX 1010 (trade name, manufactured by Ciba Specialty Chemicals) as a hindered phenol type stabilizer, 0.05 part by weight of IRGAFOS 168 (trade name, manufactured by Ciba Specialty Chemicals) as a phosphite type stabilizer and 0.1 part by weight of calcium stearate were added, followed by pelletizing, and the obtained pellets were subjected to various physical property tests and molding tests. The basic physical properties of the polymer are shown in Table 1 (No. 1 to No. 4).

Further, in FIG. 1, a GPC curve of the polymer is shown. In the drawing, the horizontal axis represents the common logarithm of the weight average molecular weight, and the vertical axis represents the elution amount (relative value).

Example 2

(1) Catalyst Preparation and Preliminary Polymerization

Catalyst preparation and preliminary polymerization were carried out in the same manner as in Example 1 (1) to (4), except that 1.601 mmol (0.468 g) of bis(cyclopentadienyl) zirconium dichloride was used based on 9.15 g of the dry montmorillonite particles treated with chromium salt, and the amount of triethylaluminum used at the time of preliminary polymerization was 19.18 mmol (2.19 g). As a result, 79.39 g of a preliminarily polymerized catalyst powder was recovered.

(2) Polymerization of Ethylene

Ethylene polymerization was carried out by using the preliminarily polymerized catalyst of the above (1) in the same manner as in Example 1 (5), except that 80 mmol of triethylaluminum was used, and the polymerization time was 3 hours. The transition of the hydrogen/ethylene ratio (mol %) at the vapor phase part in the reactor from initiation of the polymerization every 30 minutes was 1.091/0.932/0.221/0.269/0.056/0.329/0.319. As a result, 10.8 kg of a particulate ethylene homopolymer was obtained.

To 100 parts by weight of the obtained polyethylene, 0.1 part by weight of IRGANOX 1010 (trade name, manufactured by Ciba Specialty Chemicals) as a hindered phenol type stabilizer, 0.05 part by weight of IRGAFOS 168 (trade name, manufactured by Ciba Specialty Chemicals) as a phosphite type stabilizer and 0.1 part by weight of calcium stearate were added, followed by pelletizing, and the obtained pellets were subjected to various physical property tests and molding tests. The basic physical properties of the polymer are shown in Table 1 (No. 1 to No. 4) and the GPC curve of the polymer is shown in FIG. 1.

Example 3

(1) Polymerization of Ethylene

Ethylene polymerization was carried out by using the preliminarily polymerized catalyst of Example 2 (1) in the same manner as in Example 2 (2), except that the amount of hydrogen introduced to the reactor before the polymerization was reduced (pressure: 15.0 kg/cm$^2$, volume: 1090 ml), and the polymerization time was 5 hours. The transition of the hydrogen/ethylene ratio (mol %) at the vapor phase part in the reactor after initiation of the polymerization every 30 minutes was 0.830/0.685/0.418/0.421/0.201/0.463/0.224/0.418/0.210/0.411/0.203. As a result, 9.9 kg of a particulate ethylene homopolymer was obtained.

To 100 parts by weight of the obtained polyethylene, 0.1 part by weight of IRGANOX 1010 (trade name, manufactured by Ciba Specialty Chemicals) as a hindered phenol type stabilizer, 0.05 part by weight of IRGAFOS 168 (trade name, manufactured by Ciba Specialty Chemicals) as a phosphite type stabilizer and 0.1 part by weight of calcium stearate were added, followed by pelletizing, and the obtained pellets were subjected to various physical property tests and molding tests. The basic physical properties of the polymer are shown in Table 1 (No. 1 to No. 4), and the GPC curve of the polymer is shown in FIG. 1.

Example 4

(1) Magnesium Salt Treatment of Clay Mineral 216 g of a commercially available granulated and classified product of swelling montmorillonite ("Benclay SL", manufactured by MIZUSAWA INDUSTRIAL CHEMICALS, LTD., average particle size: 27 μm) was dispersed in 1952 g of a sulfuric acid aqueous solution of magnesium sulfate (magnesium sulfate concentration: 7.18%, sulfuric acid concentration: 11.8%), followed by stirring at 100° C. for 2 hours. The dispersion was subjected to filtration and washed with demineralized water, and the obtained solid cake was dried at 110° C. for 10 hours to obtain 187 g of preliminarily dried montmorillonite. The preliminarily dried montmorillonite was sieved with a screen having an aperture of 150 μm, and the particles passed through the screen were further dried under reduced pressure at 200° C. for 2 hours.

(2) Chromium Salt Treatment of Clay Mineral 24 g of commercially available $Cr(NO_3)_3.9H_2O$ was dissolved in 200 g of pure water, and then 10 g of the chemically treated montmorillonite granulated particles obtained in (1) were dispersed, followed by stirring at 90° C. for 3 hours. The dispersion was subjected to filtration and washed with demineralized water until pH became 6, and the obtained hydrated solid cake was preliminarily dried at 110° C. for 10 hours to obtain a particulate montmorillonite treated with chromium salt, the whole part of which had good flowability. 6.17 g of the preliminary dried montmorillonite particles were further dried under reduced pressure at 200° C. for 2 hours to obtain 5.85 g of dry montmorillonite particles.

(3) Organic Al Treatment of Montmorillonite Treated with Chromium Salt

In an atmosphere of nitrogen, 5.85 g of the montmorillonite particles treated with chromium salt obtained in (2) were dispersed in 6.9 ml of n-heptane in a 200 mL flask to obtain a slurry. Then, 28.2 ml of a n-heptane solution of triethylaluminum (concentration: 0.622 mol/L) was added thereto at room temperature with stirring. After they were contacted at room temperature for 1 hour, the supernatant liquid was drawn out, and the solid part was washed with n-heptane.

(4) Catalyst Preparation and Preliminary Polymerization

In an atmosphere of nitrogen, 736 ml of n-heptane and the entire amount of the solid part obtained in (3) were introduced into a reactor having a capacity of 1 L, equipped with an induction stirrer. 0.4680 mmol (0.1368 g) of bis(cyclopentadienyl)zirconium dichloride as a solution of 54.7 ml of n-heptane was added thereto, followed by stirring at 30° C. for 10 minutes. Then, 5.61 mmol (0.641 g) of triethylaluminum was added thereto, the temperature was raised to 60° C., and stirring was continued further for 10 minutes. While maintaining the temperature of the system, ethylene gas was introduced at a rate of 0.45 NL/min for 100 minutes to carry out preliminary polymerization. The supply of ethylene was terminated, and the entire content in the reactor was drawn out to a 2 L flask in an atmosphere of nitrogen. 500 mL of heptane was added to the reactor to draw out the entire content remaining in the reactor to the flask. The preliminarily polymerized catalyst slurry transferred to the flask was left to stand, about 950 mL of the supernatant liquid was removed, and the solvent was removed by drying under reduced pressure with heating at 70° C. As a result, 50.76 g of a preliminarily polymerized catalyst powder was recovered.

(5) Polymerization of Ethylene

Ethylene polymerization was carried out by using the preliminarily polymerized catalyst of the above (4) in the same manner as in Example 1 (5), except that the amount of triethylaluminum was 80.0 mmol, and the polymerization time was 5 hours. The transition of the hydrogen/ethylene ratio (mol %) at the vapor phase part in the reactor, from one hour after the initiation of the polymerization every 30 minutes, was 0.476/0.543/0.361/0.405/0.267/0.403/0.264/0.341/0.249. As a result, 4.2 kg of a particulate ethylene homopolymer was obtained.

To 100 parts by weight of the obtained polyethylene, 0.1 part by weight of IRGANOX 1010 (trade name, manufactured by Ciba Specialty Chemicals) as a hindered phenol type stabilizer, 0.05 part by weight of IRGAFOS 168 (trade name, manufactured by Ciba Specialty Chemicals) as a phosphite type stabilizer and 0.1 part by weight of calcium stearate were added, followed by pelletizing, and the obtained pellets were subjected to various physical property tests and molding tests. The basic physical properties of the polymer are shown in Table 1 (No. 1 to No. 4) and the GPC curve of the polymer is shown in FIG. 1.

Comparative Example 1

(1) Chromium Salt Treatment of Clay Mineral 20 g of the chemically treated montmorillonite granulated particles obtained in Example 1 (1) were weighed in a 1 L flask, and then dispersed in 400 ml of demineralized water having 48 g of commercially available $Cr(NO_3)_3.9H_2O$ dissolved therein, followed by stirring at 90° C. for 3 hours. After the treatment, the solid component was washed with demineralized water and dried to obtain chemically treated montmorillonite. 10.0 g of the preliminarily dried montmorillonite particles were further dried under reduced pressure at 200° C. for 2 hours to obtain 8.7 g of dry montmorillonite particles.

(2) Organic Al Treatment of Montmorillonite Treated with Chromium Salt

In an atmosphere of nitrogen, 3.0 g of the montmorillonite particles treated with chromium salt obtained in (1) was put in a 100 mL flask, and dispersed in 20 ml of toluene to obtain a slurry. Then, 1.3 ml of triethylaluminum was added at room temperature with stirring. After they were contacted at room temperature for 1 hour, the supernatant liquid was drawn out, and the solid part was washed with toluene.

(3) Preparation of Catalyst

Subsequently to (2), in an atmosphere of nitrogen, toluene was added to obtain a slurry, and 12.0 ml of a toluene solution of bis(cyclopentadienyl)zirconium dichloride (20.0 μmol/ml) was added thereto, followed by stirring at room temperature for 1 hour to obtain a catalyst component.

(4) Polymerization of Ethylene

Into a 2 L induction stirrer type autoclave adequately replaced with purified nitrogen, 1 L of n-hexane, 0.15 mmol of triethylaluminum and 100.0 mg of the catalyst component obtained in (3) were introduced. Then, the temperature was raised to 90° C., ethylene was introduced to maintain the total pressure at 22.0 kgf/cm$^2$, and stirring was continued to carry out polymerization for 1 hour. The polymerization was terminated by addition of 10 ml of ethanol. The amount of the obtained ethylene polymer was 280 g.

To 100 parts by weight of the obtained polyethylene, 0.1 part by weight of IRGANOX 1010 (trade name, manufactured by Ciba Specialty Chemicals) as a hindered phenol type stabilizer, 0.05 part by weight of IRGAFOS 168 (trade name, manufactured by Ciba Specialty Chemicals) as a phosphite type stabilizer and 0.1 part by weight of calcium stearate were added, followed by pelletizing, and the obtained pellets were subjected to various physical property tests and molding tests. The basic physical properties of the polymer are show in Table 1 (No. 1 to No. 4).

Comparative Example 2

(1) Polymerization of Ethylene

Polymerization of ethylene was carried out in the same manner as in Comparative Example 1 (5) except that the amount of the catalyst component obtained in Comparative Example 1 (4) was 120 mg, and hydrogen was added so that the gas composition in the autoclave would be [hydrogen/ethylene]=0.034 mol %. The amount of the obtained ethylene polymer was 310 g.

To 100 parts by weight of the obtained polyethylene, 0.1 part by weight of IRGANOX 1010 (trade name, manufactured by Ciba Specialty Chemicals) as a hindered phenol type stabilizer, 0.05 part by weight of IRGAFOS 168 (trade name, manufactured by Ciba Specialty Chemicals) as a phosphite type stabilizer and 0.1 part by weight of calcium stearate were added, followed by pelletizing, and the obtained pellets were subjected to various physical property tests and molding tests. The basic physical properties of the polymer are shown in Table 1 (No. 1 to No. 4).

Comparative Example 3

(1) Chromium Salt Treatment of Clay Mineral 20 g of the chemically treated montmorillonite granulated particles obtained in Example 1 (1) were weighed in a 1 L flask, and then dispersed in 400 ml of demineralized water having 48 g of commercially available $Cr(NO_3)_3.9H_2O$ dissolved therein, followed by stirring at 90° C. for 3 hours. After the treatment, the solid component was washed with demineralized water and dried to obtain chemically treated montmorillonite. 10.0 g of the preliminarily dried montmorillonite particles were further dried under reduced pressure at 200° C. for 2 hours to obtain 8.7 g of dry montmorillonite particles.

(2) Organic Al Treatment of Montmorillonite Treated with Chromium Salt

In an atmosphere of nitrogen, 3.0 g of the montmorillonite particles treated with chromium salt obtained in (1) was put in a 100 mL flask, and dispersed in 20 ml of toluene to obtain a slurry. Then, 1.3 ml of triethylaluminum was added thereto at room temperature with stirring. After they were contacted at room temperature for 1 hour, the supernatant liquid was drawn out, and the solid part was washed with toluene.

(3) Catalyst Preparation

Subsequently to (2), in an atmosphere of nitrogen, toluene was added to obtain a slurry, and 12.0 ml of a toluene solution of bis(cyclopentadienyl)zirconium dichloride (20.0 μmol/ml) was added thereto, followed by stirring at room temperature for 1 hour to obtain a catalyst component.

(4) Polymerization of Ethylene

Into a 2 L induction stirrer type autoclave adequately replaced with purified nitrogen, 1 L of n-hexane, 0.15 mmol of triethylaluminum and 120 mg of the catalyst component obtained in (3) were introduced. Then, the temperature was raised to 90° C., and hydrogen was added so that the gas composition in the autoclave would be [hydrogen/ethylene]=0.034 mol %, and then ethylene was introduced to maintain the total pressure at 22.0 kgf/cm$^2$, and stirring was continued to carry out the polymerization for 1 hour. The polymerization was terminated by addition of 10 ml of ethanol. The amount of the obtained ethylene polymer was 310 g. The basic physical properties of the polymer are shown in Table 1 (No. 1 to No. 4).

Comparative Example 4

(1) Preparation of Solid Catalyst Component

A catalyst component was prepared by using a complex as disclosed in Examples of JP-A-9-328520, which is reputed an ethylene polymer excellent in moldability. Namely, 6.0 g of commercially available silica-supported methylaluminoxane (manufactured by Witco, TA02794, containing 50 wt % as methylaluminoxane) was slurryed with 50 ml of toluene, and 11.1 ml of a toluene solution of dimethylsilylenebis(3-methylcyclopentadienyl)zirconium dichloride (mixture ratio with a diastereoisomer of 1:1) (Zr=0.0103 mmol/ml) was dropwise added thereto at 20° C. over a period of 30 minutes. Then, the temperature was raised to 80° C., and the reaction was carried out at the temperature for 2 hours. Then, the supernatant liquid was removed, followed by washing with heptane twice.

(2) Preliminary Polymerization of Ethylene 4 g of the solid catalyst obtained in the above (1) was slurryed again with 200 ml of heptane. 6.84 ml of a heptane solution of triisobutylaluminum (0.731 mmol/ml) and 0.36 g of 1-hexene were added thereto to carry out preliminary polymerization of ethylene at 35° C., whereby 3 g of polyethylene was preliminarily polymerized.

(3) Polymerization of Ethylene

Into an autoclave made of stainless steel having an internal volume of 3 L adequately replaced with nitrogen, 1.5 L of heptane was introduced, and the system in the autoclave was replaced with mixed gas of ethylene and hydrogen (hydrogen content: 0.05 mol %). Then, the temperature in the system was set at 60° C., and 1.5 mmol of triisobutylaluminum and 180 mg of the preliminarily polymerized catalyst prepared in the above (2) were added thereto. Then, mixed gas of ethylene and hydrogen having the same composition as mentioned above was introduced, and the polymerization was initiated at a total pressure of 8 $kg/cm^2$-G. Then, the mixed gas alone was resupplied to maintain the total pressure at 8 $kg/cm^2$-G, and polymerization was carried out at 70° C. for 1.5 hours. The results are shown in Table 1 (No. 1 to No. 4).

Industrial Applicability

The present invention provides an ethylene polymer excellent in molding processability represented by uniform extensibility, drawdown resistance, swell and extrudability, and mechanical properties represented by rigidity, impact resistance and ESCR. Particularly, the ethylene polymer of the present invention is remarkably excellent in balance between rigidity and ESCR as compared with a conventionally known ethylene polymer.

TABLE 1

(No. 1)

| | HLMI g/10 min | Density g/cm$^3$ | Flexural modulus kgf/cm$^2$ | ESCR hr | Fulfillment of formula (i) | Fulfillment of formula (ii) |
|---|---|---|---|---|---|---|
| Example 1 | 3.5 | 0.963 | 17500 | 950 | ○ | ○ |
| Example 2 | 7.5 | 0.963 | 15100 | 400 | ○ | ○ |
| Example 3 | 4.2 | 0.962 | 14100 | 950 | ○ | ○ |
| Example 4 | 17.0 | 0.967 | 18200 | 740 | ○ | ○ |
| Comparative Example 1 | 0.55 | 0.946 | 9500 | 350 | X | X |
| Comparative Example 2 | 4.79 | 0.954 | 12000 | 110 | X | X |
| Comparative Example 3 | 4.51 | 0.953 | 10200 | 100 | X | X |
| Comparative Example 4 | 92 | 0.960 | 14300 | 60 | X | X |

TABLE 1

(No 2)

| | HLMI g/10 min | Density d g/cm$^3$ | Mn (GPC) | Mw (GPC) | Q (GPC) | Mlmax (GPC) | Melting point Tm ° C. | Heat quantity of fusion ΔH J/g | Fulfillment of formula (iii) | Fulfillment of formula (iv) |
|---|---|---|---|---|---|---|---|---|---|---|
| Example 1 | 3.5 | 0.963 | 9,130 | 310,900 | 34.0 | 4,591 | 136.0 | 226.1 | ○ | ○ |
| Example 2 | 7.5 | 0.963 | 13,000 | 275,600 | 21.2 | 12,100 | 136.8 | 231.8 | ○ | ○ |
| Example 3 | 4.2 | 0.962 | 13,400 | 324,900 | 24.2 | 9,129 | 135.7 | 230.0 | ○ | ○ |
| Example 4 | 17.0 | 0.967 | 10,500 | 227,800 | 21.7 | 7,916 | 135.0 | 241.3 | ○ | ○ |
| Comparative Example 1 | 0.55 | 0.946 | 192,100 | 707,200 | 3.7 | 317,000 | — | — | X | — |
| Comparative Example 2 | 4.79 | 0.954 | 99,200 | 572,100 | 5.8 | 163,100 | — | — | X | — |
| Comparative Example 3 | 4.51 | 0.953 | 109,300 | 591,400 | 5.4 | 191,300 | 135.4 | 209.4 | X | X |

TABLE 1

(No. 3)

| | Mw (Malls) | Mc value (%) | R | Lm | Swell ratio | MT |
|---|---|---|---|---|---|---|
| Example 1 | 521,000 | 15.2 | 39 | 1.02 | 1.45 | 18.7 |
| Example 2 | 411,000 | 13.1 | 17 | 1.11 | 1.53 | 9.2 |
| Example 3 | 457,000 | 15.2 | 17 | 1.05 | 1.33 | 9.2 |
| Example 4 | 384,000 | 12.3 | 17 | 1.18 | 1.56 | 8.6 |
| Comparative Example 1 | 829,100 | 10.1 | 24 | 1.21 | 1.62 | 65.1 |

TABLE 1-continued (No. 3)

| | Mw (Malls) | Mc value (%) | R | Lm | Swell ratio | MT |
|---|---|---|---|---|---|---|
| Comparative Example 2 | 614,800 | 8.7 | 19 | 1.51 | 1.91 | 33.5 |
| Comparative Example 3 | 691,400 | 8.7 | 21 | 1.49 | 1.88 | 18.1 |
| Comparative Example 4 | — | — | 1 | >3 | 1.90 | 0.9 |

TABLE 1

(No. 4)

| | G' (0.1) Pa | G' (1) Pa | G' (10) Pa | ηe Pa · s |
|---|---|---|---|---|
| Example 1 | 3.34E+04 | 9.67E+04 | 1.52E+05 | 2.80E+06 |
| Example 2 | 2.64E+04 | 5.26E+04 | 1.11E+05 | 1.97E+06 |
| Example 3 | 3.16E+04 | 5.77E+04 | 1.34E+05 | 2.17E+06 |
| Example 4 | 1.85E+04 | 4.71E+04 | 8.62E+04 | 1.21E+06 |
| Comparative Example 1 | 2.26E+04 | 3.81E+04 | 1.38E+05 | 1.07E+05 |
| Comparative Example 2 | 8.81E+03 | 2.22E+04 | 6.49E+04 | 8.79E+05 |
| Comparative Example 3 | 9.13E+03 | 2.77E+04 | 7.81E+04 | 9.56E+05 |
| Comparative Example 4 | 4.50E+01 | 6.21E+02 | 1.01E+04 | 5.67E+04 |

What is claimed is:

1. An ethylene polymer, which is an ethylene homopolymer or a copolymer of ethylene with an α-olefin having a carbon number of from 3 to 20, and which satisfies the following conditions (1) to (4):

(1) the melt index (HLMI) under a load of 21.6 kg at 190° C. is from 0.1 to 1,000 g/10 min, (2) the density (d) is from 0.935 to 0.985 g/cm$^3$, (3) the relation between HLMI and d satisfies the following formula (i):

$$d \geqq 0.00900 \times \mathrm{Log}(HLMI) + 0.951 \quad \text{(i)}$$

(4) the relation between the environmental stress cracking resistance (ESCR) and the flexural modulus (M) satisfies the following formula (ii):

$$M \geqq -7310 \times \mathrm{Log}(ESCR) + 32300 \quad \text{(ii).}$$

2. The ethylene polymer according to claim 1, wherein the melt index (HLMI) under a load of 21.6 kg at 190° C. of the above condition (1) is from 1 to 100 g/10 min.

3. The ethylene polymer according to claim 1, wherein the relation between HLMI and d of the condition (3) satisfies the following formula (i-1):

$$d \geqq 0.00697 \times \mathrm{Log}(HLMI) + 0.956 \quad \text{(i-1).}$$

4. The ethylene polymer according to claim 1, wherein the flexural modulus (M) is at least 15000 kgf/cm$^2$.

5. The ethylene polymer according to claim 1, wherein the environmental stress cracking resistance (ESCR) is at least 500 hours.

6. The ethylene polymer according to claim 1, which satisfies the following conditions (5) and (6) in addition to the conditions (1) to (4):

(5) the molecular weight (M1max) at the highest peak position in the molecular weight distribution curve as measured by gel permeation chromatography (GPC) satisfies the relation of the following formula (iii):

$$\mathrm{Log}(M1\mathrm{max}) \leqq -0.307 \times \mathrm{Log}(HLMI) + 4.87 \quad \text{(iii)}$$

(6) the melting point (Tm) as measured by differential scanning calorimetry (DSC) and (d) satisfy the following formula (iv):

$$Tm \leqq 538d - 378 \quad \text{(iv)}$$

7. The ethylene polymer according to claim 1, which satisfies the following condition (7) in addition to the conditions (1) to (4):

(7) in chromatogram employing a Rayleigh ratio having a scattering angle extrapolated to 0° as obtained by GPC-Malls measurement, the area percentage (Mc value) of the chromatogram of a component having a molecular weight as calculated from this measurement of at least 1,000,000 is at least 5%.

8. The ethylene polymer according to claim 1, wherein the ratio (Mw/Mn) of the number average molecular weight (Mn) to the weight average molecular weight (Mw) as measured by GPC is higher than 7, in addition to the conditions (1) to (4).

9. The ethylene polymer according to claim 1, which is obtained by homopolymerization of ethylene or copolymerization of ethylene with an α-olefin having a carbon number of from 3 to 20, in the presence of a catalyst containing [A] a transition metal compound of Group IV to VI of the Periodic Table having at least one conjugated five-membered cyclic ligand and [B] an ion exchangeable layered silicate, in a single polymerization apparatus, wherein an organic aluminum compound is used in such an amount that the ratio of aluminum in the organic aluminum compound to the component [B] is within a range of from 4.0 to 100 (mmol-Al/g-[B]).

10. A molded product of an ethylene polymer, which is obtained by subjecting the ethylene polymer as defined in claim 1 to injection molding, compression injection molding, rotational molding, extrusion, blow molding or blow molding.

11. A method for producing the ethylene polymer as defined in claim 1 comprising:

homopolymerizing ethylene or copolymerizing ethylene with an α-olefin having a carbon number of from 3 to 20, in the presence of a catalyst containing [A] a transition metal compound of Group IV to VI of the Periodic Table having at least one conjugated fine-membered cyclic ligand and [B] an ion exchangeable layered silicate, in a single polymerization apparatus, wherein an organic aluminum compound is used in such an amount that the ratio of aluminum in the organic aluminum compound to the component [B] is within a range of from 4.0 to 100 (mmol-Al/g-[B]).

* * * * *